(12) United States Patent
Mikan

(10) Patent No.: US 9,712,957 B2
(45) Date of Patent: *Jul. 18, 2017

(54) LIMITING SERVICES BASED ON LOCATION

(71) Applicant: AT&T Mobility II LLC, Atlanta, GA (US)

(72) Inventor: Jeffrey Clinton Mikan, Atlanta, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/480,203

(22) Filed: Sep. 8, 2014

(65) Prior Publication Data

US 2015/0057026 A1    Feb. 26, 2015

Related U.S. Application Data

(63) Continuation of application No. 11/196,005, filed on Aug. 3, 2005, now Pat. No. 8,832,792.

(51) Int. Cl.
*H04W 4/02* (2009.01)
*H04L 29/06* (2006.01)
(Continued)

(52) U.S. Cl.
CPC .............. *H04W 4/02* (2013.01); *H04L 63/08* (2013.01); *H04L 63/083* (2013.01);
(Continued)

(58) Field of Classification Search
CPC ....... H04L 12/189; H04L 51/38; H04L 64/00; H04L 57/00; H04L 57/18; H04L 57/30;
(Continued)

(56) References Cited

U.S. PATENT DOCUMENTS 5,778,304 A    7/1998  Grube et al.
5,870,029 A    2/1999  Otto et al.
(Continued)

FOREIGN PATENT DOCUMENTS

EP    1435749    7/2004
EP    1445923    8/2004
(Continued)

OTHER PUBLICATIONS

Japan Office Action dated Jul. 3, 2012 in JP Application No. 2008-525058.
(Continued)

*Primary Examiner* — Joseph P Hirl
*Assistant Examiner* — Kalish Bell
(74) *Attorney, Agent, or Firm* — Hartman & Citrin LLC

(57) ABSTRACT

A system for authorizing services in wireless devices based on a type of service requested and a location of the wireless device is provided. For example, in a wireless telephony system, when a session is set up via an Internet Protocol-based system, an application server queries a location service for the location of the handset requesting the service. If the handset or the receiving handset is in a location that is not authorized for the requested service based on the position of the handset, the connection is not enabled. A message may be transmitted to the sending handset to inform a user that the service is not authorized for the location.

20 Claims, 5 Drawing Sheets

(51) Int. Cl.
  *H04W 12/06* (2009.01)
  *H04W 48/04* (2009.01)
  *H04W 64/00* (2009.01)
  *H04W 80/00* (2009.01)
  *H04W 4/14* (2009.01)

(52) U.S. Cl.
  CPC ........... *H04W 4/021* (2013.01); *H04W 12/06* (2013.01); *H04W 4/14* (2013.01); *H04W 48/04* (2013.01); *H04W 64/00* (2013.01); *H04W 80/00* (2013.01)

(58) Field of Classification Search
  CPC ........ H04L 69/329; H04W 4/00; H04W 4/02; H04W 8/16; H04W 64/00
  USPC .......... 726/2, 3, 16, 27; 455/433, 440, 404.2
  See application file for complete search history.

(56) References Cited

U.S. PATENT DOCUMENTS

| | | | |
|---|---|---|---|
| 6,011,973 | A | 1/2000 | Valentine et al. |
| 6,122,499 | A | 9/2000 | Magnusson |
| 6,131,024 | A * | 10/2000 | Boltz ............................ 455/405 |
| 6,449,474 | B1 | 9/2002 | Mukherjee et al. |
| 6,615,048 | B1 | 9/2003 | Hayashi |
| 8,832,792 | B2 * | 9/2014 | Mikan ............................... 726/3 |
| 2002/0023010 | A1 | 2/2002 | Rittmaster et al. |
| 2003/0100307 | A1 | 5/2003 | Wolochow et al. |
| 2003/0149874 | A1 | 8/2003 | Balfanz et al. |
| 2003/0186702 | A1 | 10/2003 | McConnell et al. |
| 2003/0186710 | A1 | 10/2003 | Muhonen et al. |
| 2004/0018836 | A1 * | 1/2004 | Jang ........................... 455/422.1 |
| 2004/0032843 | A1 | 2/2004 | Schaefer et al. |
| 2004/0075675 | A1 * | 4/2004 | Raivisto et al. .............. 345/700 |
| 2005/0021976 | A1 | 1/2005 | Trossen |
| 2005/0088973 | A1 | 4/2005 | Ibezim et al. |
| 2006/0092891 | A1 | 5/2006 | Goldberg et al. |
| 2006/0107307 | A1 | 5/2006 | Knox et al. |
| 2006/0206586 | A1 * | 9/2006 | Ling et al. .................... 709/219 |
| 2006/0293024 | A1 | 12/2006 | Benco et al. |
| 2007/0079359 | A1 | 4/2007 | Lagnado |

FOREIGN PATENT DOCUMENTS

| | | |
|---|---|---|
| JP | 2001016652 | 1/2001 |
| WO | WO 99/55102 | 10/1999 |
| WO | WO 03075125 | 9/2003 |
| WO | WO 2004/080092 | 9/2004 |

OTHER PUBLICATIONS

English Translation of Japan Office Action dated Jul. 3, 2012 in JP Application No. 2008-525058.
International Application No. PCT/US2006/029515 International Search Report mailed Dec. 29, 2006.
International Application No. PCT/US2006/029515 International Preliminary Report and Written Opinion issued Feb. 5, 2008.
Application No. GB0801919.2 Examination Report dated Jan. 5, 2010.
U.S. Office Action dated Jun. 23, 2009 in U.S. Appl. No. 11/196,005.
U.S. Office Action dated Mar. 16, 2010 in U.S. Appl. No. 11/196,005.
U.S. Office Action dated Jul. 21, 2010 in U.S. Appl. No. 11/196,005.
U.S. Office Action dated Jan. 4, 2011 in U.S. Appl. No. 11/196,005.
U.S. Office Action dated May 25, 2011 in U.S. Appl. No. 11/196,005.
U.S. Office Action dated Mar. 28, 2012 in U.S. Appl. No. 11/196,005.
U.S. Office Action dated Jun. 18, 2013 in U.S. Appl. No. 11/196,005.
U.S. Office Action dated Sep. 30, 2013 in U.S. Appl. No. 11/196,005.
U.S. Notice of Allowance dated Jan. 15, 2014 in U.S. Appl. No. 11/196,005.
U.S. Notice of Allowance dated Apr. 24, 2014 in U.S. Appl. No. 11/196,005.

* cited by examiner

LIMITING SERVICES BASED ON LOCATION

CROSS-REFERENCE TO RELATED APPLICATIONS

This application is a continuation of U.S. patent application Ser. No. 11/196,005, filed Aug. 3, 2005, now U.S. Pat. No. 8,832,792, which is incorporated by reference herein in its entirety.

FIELD OF THE INVENTION

The present invention is directed to wireless services. In particular, the present invention is directed to a system of authorizing services in accordance with a type of requested service and a location of a wireless device.

BACKGROUND OF THE INVENTION

Global system for mobile communication (GSM) is one of the most widely used wireless access systems in today's fast growing communication systems. GSM provides circuit-switched data services to subscribers, such as mobile telephone or computer users. General Packet Radio Service (GPRS), which is an extension to GSM technology, introduces packet switching to GSM networks. GPRS uses a packet-based wireless communication technology to transfer high and low speed data and signaling in an efficient manner. GPRS optimizes the use of network and radio resources, thus enabling the cost effective and efficient use of GSM network resources for packet mode applications.

Conventional systems provide for multimedia services, such as sharing pictures and streaming of video and audio. However, conventional systems are unable to place limitations on these services and other services based on location. This presents problems in locations where, e.g., video/audio recording is not permissible. For example, it would be desirable to prevent video streaming from a stadium during a sporting event or to prevent audio streaming from a concert. Other examples include disabling certain services from within corporate buildings, during examinations at schools, etc.

SUMMARY OF THE INVENTION

A system for authorizing services in wireless devices based on a type of service requested and a location of the wireless device is provided. For example, in a wireless telephony system, when a session is set up via an Internet Protocol-based system, an application server queries a location service for the location of the handset requesting the service. If the sending handset or the receiving handset is in a location that is not authorized for the requested service based on the position of the handset, the connection is not enabled. A message may be transmitted to the sending handset to inform a user that the service is not authorized for the location.

Alternatively, the handset may receive broadcasts of location data that is stored in the handset in a first-in-first-out basis. The location data includes location/service combinations that allow the handset itself to determine if a service is authorized at present location of the handset. The location data may be updated as necessary to ensure that the handset has a current list contained therein.

DETAILED DESCRIPTION OF ILLUSTRATIVE EMBODIMENTS

Figure 1:
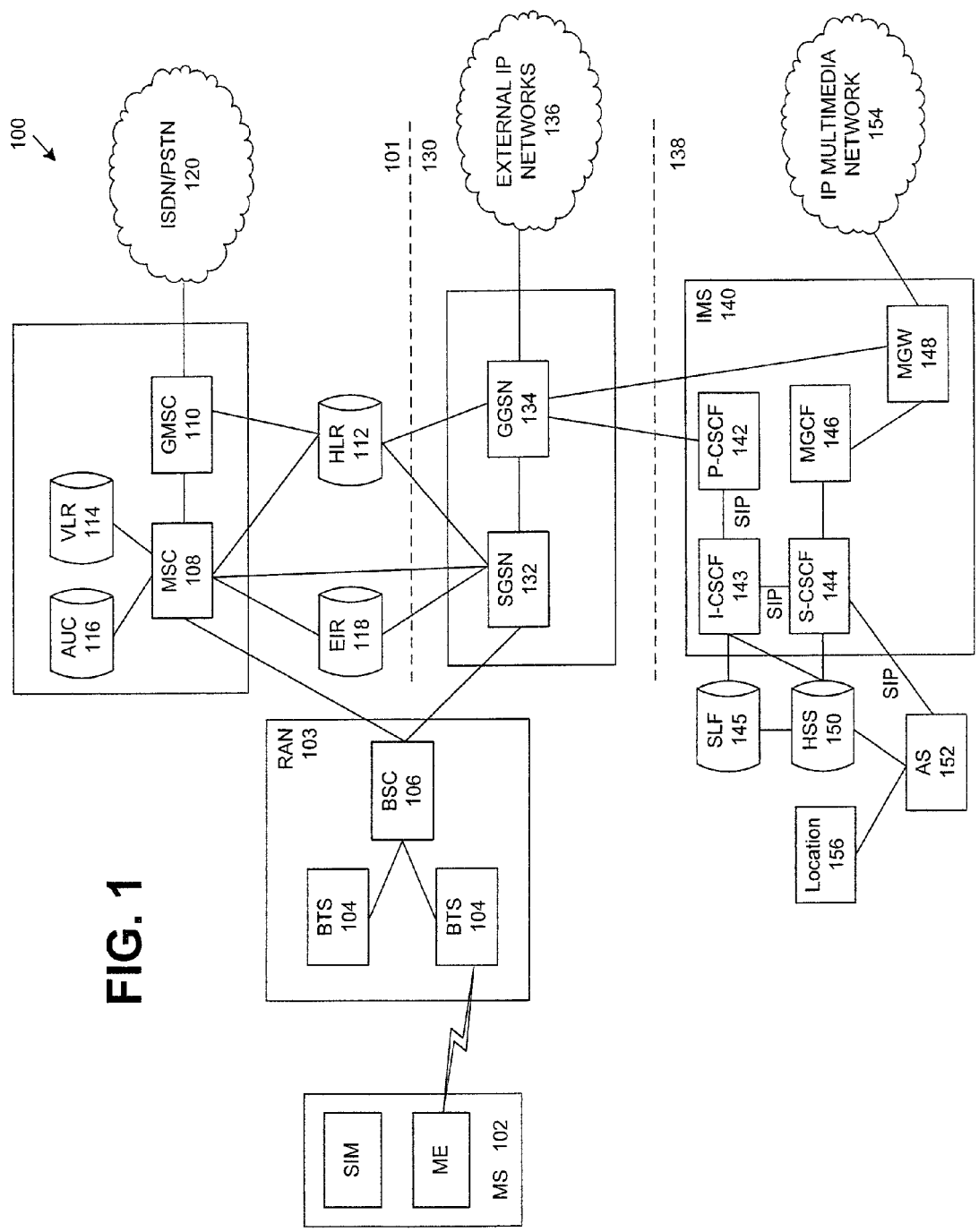
FIG. 1 illustrates an exemplary GSM/GPRS/IP multimedia network architecture.

FIG. 1 shows a GSM/GPRS/IP multimedia network architecture 100 that includes a GSM core network 101, a GPRS network 130 and an IP multimedia network 138. The GSM core network 101 includes a Mobile Station (MS) 102, at least one Base Transceiver Station (BTS) 104 and a Base Station Controller (BSC) 106. The MS 102 is physical equipment or Mobile Equipment (ME), such as a mobile phone or a laptop computer that is used by mobile subscribers, with a Subscriber identity Module (SIM). The SIM includes an International Mobile Subscriber Identity (IMSI), which is a unique identifier of a subscriber. The BTS 104 is physical equipment, such as a radio tower, that enables a radio interface to communicate with the MS. Each BTS may serve more than one MS. The BSC 106 manages radio resources, including the BTS. The BSC may be connected to several BTSs. The BSC and BTS components, in combination, are generally referred to as a base station (BSS) or radio access network (RAN) 103.

The GSM core network 101 also includes a Mobile Switching Center (MSC) 108, a Gateway Mobile Switching Center (GMSC) 110, a Home Location Register (HLR) 112, Visitor Location Register (VLR) 114, an Authentication Center (AuC) 116, and an Equipment Identity Register (EIR) 118. The MSC 108 performs a switching function for the network. The MSC also performs other functions, such as registration, authentication, location updating, handovers, and call routing. The GMSC 110 provides a gateway between the GSM network and other networks, such as an Integrated Services Digital Network (ISDN) or Public Switched Telephone Networks (PSTNs) 120. In other words, the GMSC 110 provides interworking functionality with external networks.

The HLR 112 is a database that contains administrative information regarding each subscriber registered in a corresponding GSM network. The HLR 112 also contains the current location of each MS. The VLR 114 is a database that contains selected administrative information from the HLR 112. The VLR contains information necessary for call control and provision of subscribed services for each MS currently located in a geographical area controlled by the VLR. The HLR 112 and the VLR 114, together with the MSC 108, provide the call routing and roaming capabilities of GSM. The AuC 116 provides the parameters needed for authentication and encryption functions. Such parameters allow verification of a subscriber's identity. The EIR 118 stores security-sensitive information about the mobile equipment.

To gain access to GSM services, such as speech, data, and short message service (SMS), the MS, such as the MS 102, first registers with the network to indicate its current location by performing a location update and IMSI attach procedure. The MS 102 sends a location update including its current location information to the MSC/VLR, via the BTS 104 and the BSC 106. The location information is then sent to the MS's HLR. The HLR is updated with the location information received from the MSC/VLR. The location update also is performed when the MS 102 moves to a new location area. Typically, the location update is periodically performed to update the database as location updating events occur.

The GPRS network 130 is logically implemented on the GSM core network architecture by introducing two packet-switching network nodes, a serving GPRS support node (SGSN) 132 and a Gateway GPRS support node (GGSN) 134. The SGSN 132 is at the same hierarchical level as the MSC 108 in the GSM network. The SGSN 132 controls the connection between the GPRS network 130 and the MS 102. The SGSN 132 also keeps track of individual MS's locations and security functions and access controls. The GGSN 134 provides a gateway between the GPRS network 130 and a public packet network (PDN) or other IP networks 136. That is, the GGSN 134 provides interworking functionality with external networks, and sets up a logical link to the MS 102 through the SGSN 132. When packet-switched data leaves the GPRS network 130, it is transferred to an external TCP-IP network 136, such as an X.25 network or the Internet. In order to access GPRS services, the MS 102 first attaches itself to the GPRS network 130 by performing an attach procedure. The MS 102 then activates a packet data protocol (PDP) context, thus activating a packet communication session between the MS 102, the SGSN 132, and the GGSN 134.

In a GSM/GPRS network, GPRS services and GSM services can be used in parallel. The MS can operate in one of three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 130 can be designed to operate in three network operation modes (NOM1, NOM2 and NOM3). A network operation mode of a GPRS network 130 is indicated by a parameter in system information messages transmitted within a cell. The system information messages dictate a MS 102 where to listen for paging messages and how to signal towards the network. The network operation mode represents the capabilities of the GPRS network 130. In a NOM1 network, a MS 102 can receive pages from a circuit switched domain (voice call) when engaged in a data call. The MS 102 can suspend the data call or take both simultaneously, depending on the ability of the MS 102. In a NOM2 network, a MS 102 may not receive pages from a circuit switched domain when engaged in a data call, since the MS 102 is receiving data and is not listening to a paging channel. In a NOM3 network, a MS 102 can monitor pages for a circuit switched network while receiving data and vice versa.

The IP multimedia network 138 was introduced with 3GPP Release 5, and includes an IP multimedia subsystem (IMS) 140 to provide rich multimedia services to end users. A representative set of the network entities within the IMS 140 are a call/session control function (CSCF), a media gateway control function (MGCF) 146, a media gateway (MGW) 148, and a master subscriber database, called a home subscriber server (HSS) 150. The HSS 150 may be common to the GSM network 101, the GPRS network 130 as well as the IP multimedia network 138.

The IP multimedia system 140 is built around the call/session control function, of which there are three types: an interrogating CSCF (I-CSCF) 143, a proxy CSCF (P-CSCF) 142, and a serving CSCF (S-CSCF) 144. The P-CSCF 142 is the MS's 102 first point of contact with the IMS 140. The P-CSCF 142 forwards session initiation protocol (SIP) messages received from the MS to a SIP server in a home network (and vice versa) of the MS. The P-CSCF 142 may also modify an outgoing request according to a set of rules defined by the network operator (for example, address analysis and potential modification).

The I-CSCF 143, forms an entrance to a home network and hides the inner topology of the home network from other networks and provides flexibility for selecting an S-CSCF 144. The I-CSCF 143 may contact a subscriber location function (SLF) 145 to determine which HSS 150 to use for the particular subscriber, if multiple HSS's 150 are present. The S-CSCF 144 performs the session control services for the MS 102. This includes routing originating sessions to external networks and routing terminating sessions to visited networks. The S-CSCF 144 also decides whether an application server (AS) 152 is required to receive information on an incoming SIP session request to ensure appropriate service handling. This decision is based on information received from the HSS 150 (or other sources, such as an application server 152). The AS 152 also communicates to a location server 156 (e.g., a Gateway Mobile Location Center (GMLC)) that provides a position (e.g., latitude/longitude coordinates) of the MS 102.

The HSS 150 contains a subscriber profile and keeps track of which core network node is currently handling the subscriber. The HSS 150 also supports subscriber authentication and authorization functions (AAA). In networks with more than one HSS 150, a subscriber location function provides information on the HSS 150 that contains the profile of a given subscriber.

The MGCF 146 provides interworking functionality between SIP session control signaling from the IMS 140 and ISUP/BICC call control signaling from the external GSTN networks (not shown). It also controls the media gateway (MGW) 148 that provides user-plane interworking functionality (e.g., converting between AMR- and PCM-coded voice). The MGW 148 also communicates with other IP multimedia networks 154.

Figure 2:
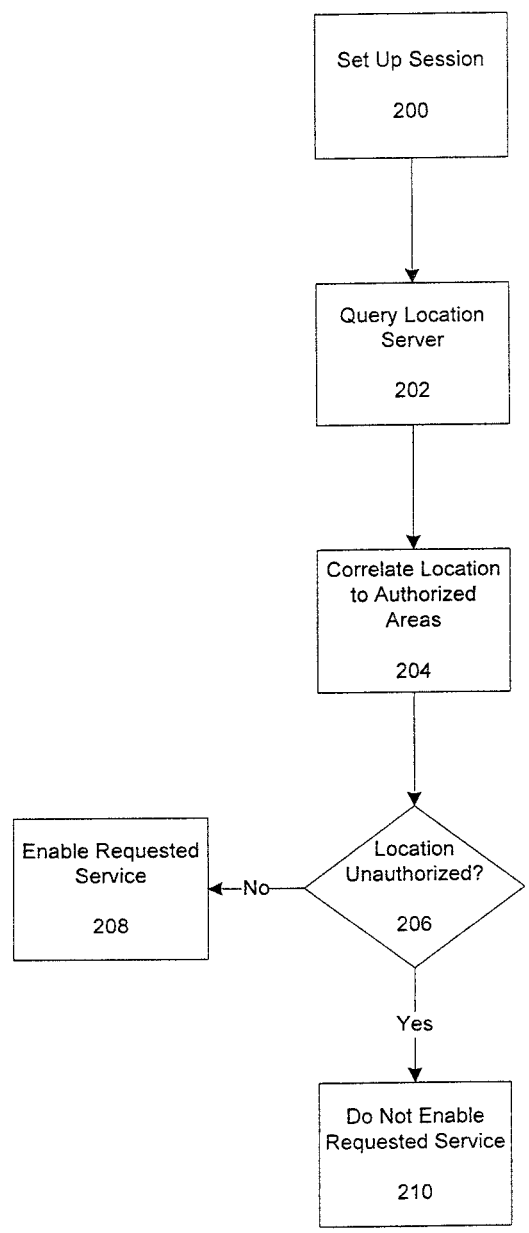
FIG. 2 illustrates exemplary processes performed in accordance with the present invention.

As noted above, the IMS 140 provides a rich set of multimedia services. It may be desirable to enable/disable some services based on the location of the sending and/or receiving MS 102. For example, it may be desirable to prevent video streaming from inside movie theaters, audio streaming from a concert hall, sending pictures from restricted locations, etc. FIG. 2 illustrates exemplary processes performed in accordance with the present invention. The process begins a step 200, where a session is set up via the IMS 140. The IMS 140 then queries the location server 156 at step 202 to determine the location of the sending and receiving handsets (MS) 102. Assisted GPS or triangulation may be used in order to determine the location of handset/MS 102. At step 204, the returned location is correlated against a database of unauthorized locations (the database may contain authorized locations in the alternative). If the location is unauthorized at step 206, then the requested service is not enabled at step 210. A text message may be sent to the handset informing the user that the requested service is not authorized for his/her location. Otherwise, the service is enabled at step 208.

An additional level of detail may be provided at step 206, where the location may be unauthorized for certain times. For example, text messaging may be unauthorized at a school during examinations (whereas emergency services would be authorized), but authorized for other times. Camera phones could be blocked for sporting events, but enabled for use after the game so pictures can be taken of the players after the game. It is noted that the processes of FIG. 2 may be performed for either the sending or receiving handset.

Alternatively, in a 2G architecture, Enhanced Data rates for Global Evolution (EDGE) or in a 3G architecture, Universal Mobile Telecommunications System (UMTS) may be used in place of the IMS 140. These may require a different infrastructure for each multimedia service to be provided, however they both could be substituted for the IMS to accomplish the processes performed in FIG. 2. The present invention could be adapted to allow/prevent services based on the location of either the sending or receiving handset. Services such as video, audio, Push to talk over Cellular (PoC), peer-to-peer communication, data applications, etc. and are not limited to the above exemplary list as one of ordinary skill in the art would understand there are additional services that may be enabled/disabled.

Figure 3:
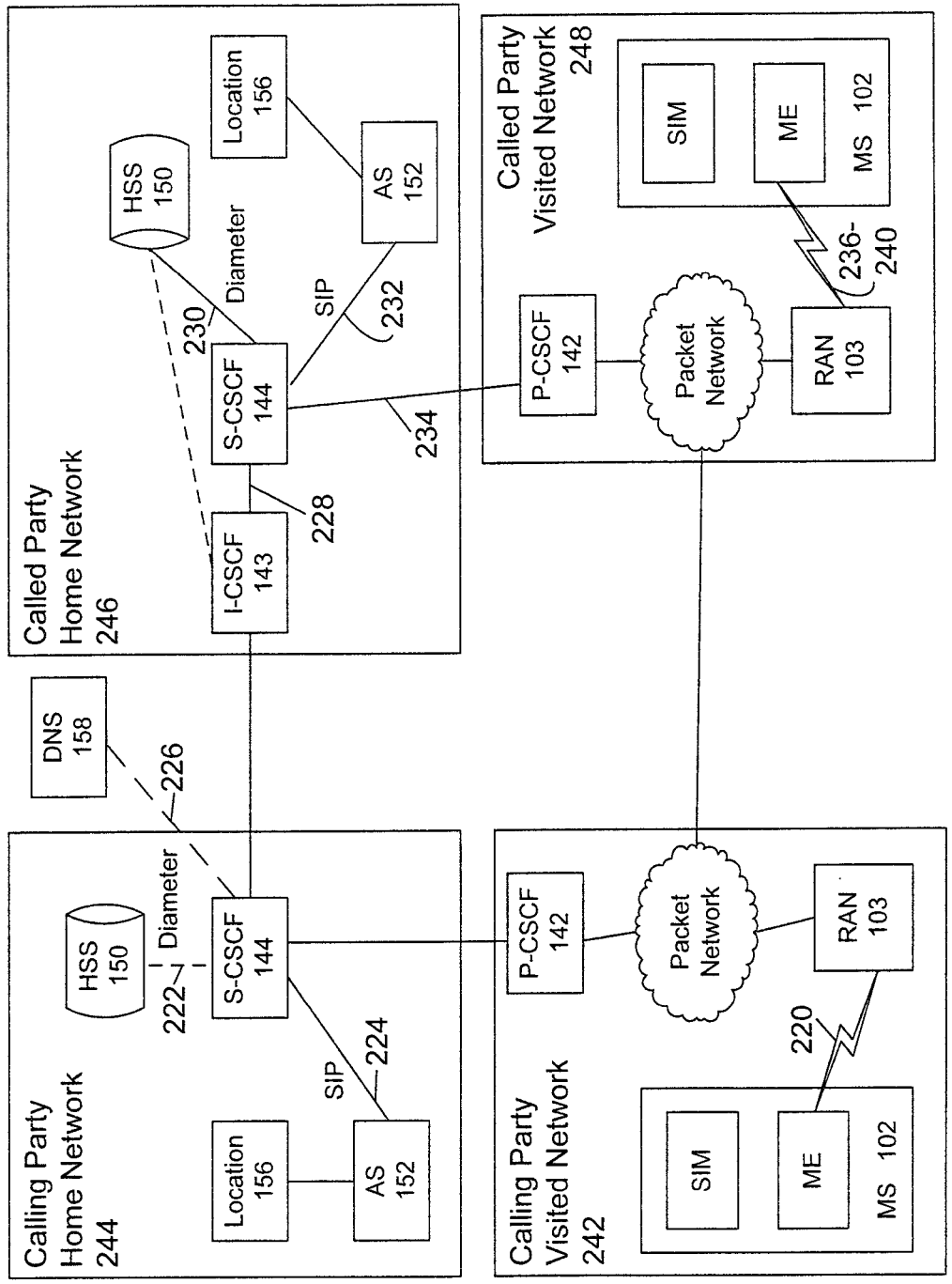
FIG. 3 is an exemplary high level call flow where a calling party contacts a called party.

Referring now to FIG. 3, there is an exemplary high level call flow where a calling party in a Calling Party Visiting Network 242 attempts to contact a called party in a Called Party Visiting Network 248. A SIP invite (reference 220) is communicated by the calling party. The SIP invite is forwarded to the P-CSCF 142 in the Calling Party Visiting Network 242 and then to the S-CSCF 144 in the Calling Party Home Network 244. The S-CSCF 144 retrieves the subscriber profile of the calling party at reference 222. The diameter protocol may be used for Authentication, Authorization, and Accounting (AAA) when accessing the HSS 150. Service logic is applied at reference 224, where steps 202-210 may be performed by the AS 152 (or other element) to determine if the service associated with the SIP request and the calling party is authorized. If so, then the address of the called party's Called Party Home Network 246 is determined using Domain Name System (DNS) 158 (reference 226). This option is not necessary if the calling party and the called party share the same Home Network.

Next, the registrar of the called party is determined and the SIP invite is forwarded (reference 228). The called party subscriber profile is retrieved (reference 230) and service logic is applied at reference 232. Again, steps 202-210 may be performed by the AS 152 (or other) to determine if the service associated with the SIP request and the called party is authorized. The SIP invite is forwarded to the called party at reference 234. Next, service data point (SDP) negotiation and resource reservation is performed; the called party's MS 102 is ringed/alerted; and the called party answers the call to connect the parties.

Figure 4:
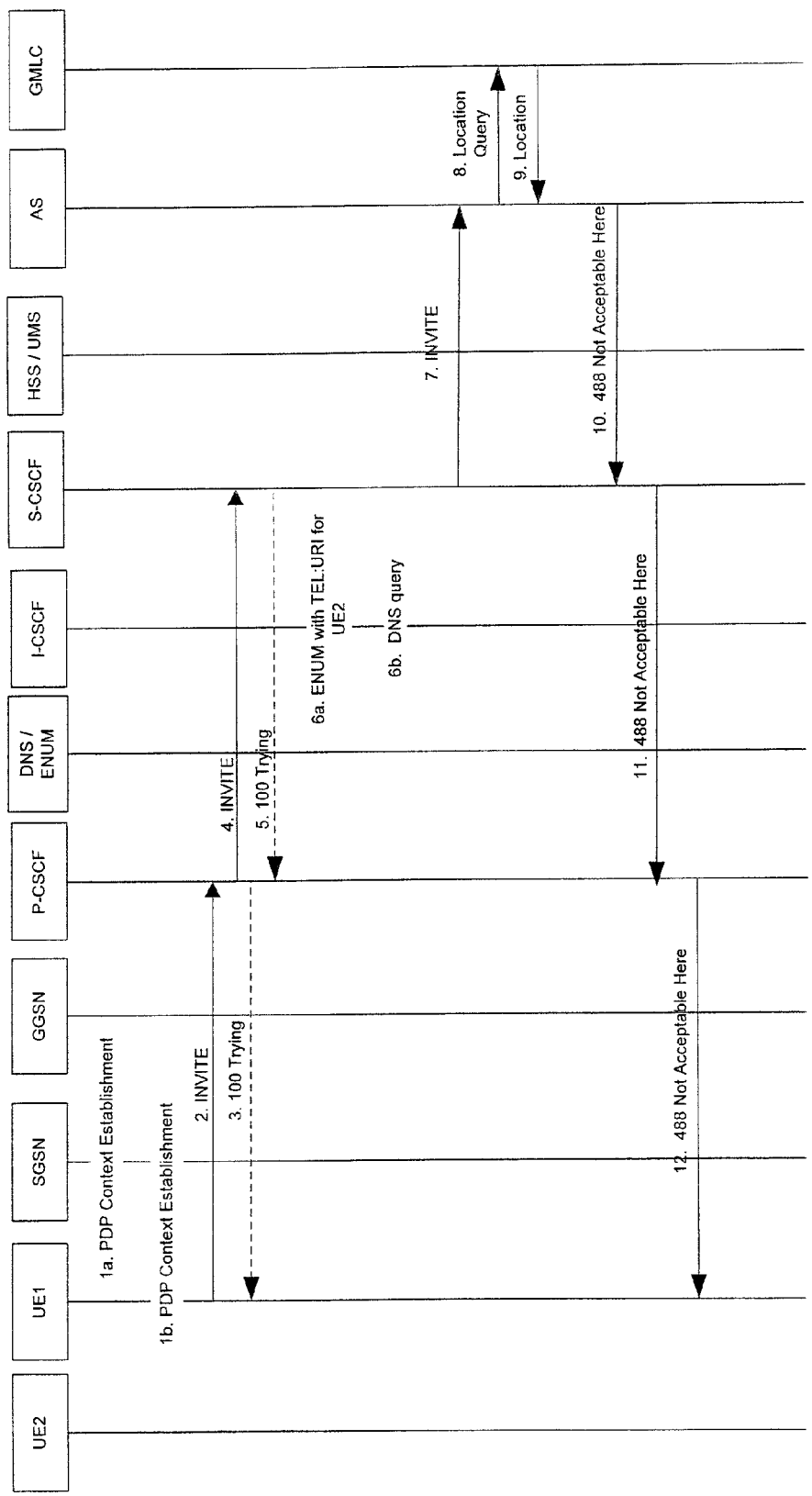
FIG. 4 is an exemplary detailed call flow to implement service blocking.

FIG. 4 illustrates an exemplary detailed call flow to implement service blocking. The flow begins when packet data protocol (PDP) context establishment and P-CSCF 142 discovery may be performed for the originating MS/UE1 (1a.). The P-CSCF 142 service discovery should still be valid from registration. Next, PDP context establishment and P-CSCF 142 discovery is performed for the receiving MS/UE2 (1b.). Here again the P-CSCF 142 service discovery should still be valid from registration.

Next, a SIP INVITE is communicated from UE1 to its P-CSCF 142 via tel: URL (2.). A "100 Trying" is forwarded to UE1 to prevent further attempts to initiate the SIP INVITE (3.). The SIP INVITE is forward by P-CSCF 142 to S-CSCF 144 (4.). The P-CSCF 142 retains the UE1 S-CSCF 144 information. A "100 Trying" is then returned to the P-CSCF 142 (5.).

Next, an ENUM query on tel: URI for UE2 is optionally performed on behalf of UE1 if tel: URI was sent. ENUM is the Internet Engineering Task Force (IETF) protocol that maps of a telephone number from the PSTN to Internet services, i.e., a telephone number is input and an URL/URI is output (6a.). Next, a DNS query is performed to find the I-CSCF 143 for UE2 (6b.).

The SIP INVITE is forwarded from the S-CSCP 144 to the AS 152 that will be providing the service requested by UE1 (7.). The AS 152 then performs a location query of the GMLC to determine the location of UE1 and/or UE2 (8.). The location is returned to the AS 152 (9.) If the location is not authorized, then the AS 152 returns a SIP "488 Not Acceptable Here" message to the S-CSCF 144, which is forwarded to the P-CSCF 142 and UE1. This message informs the user of UE1 that the user's agent (AS) 152 was contacted successfully but the specific resource addressed by the Request-URI (e.g., video services) is not acceptable.

Figure 5:
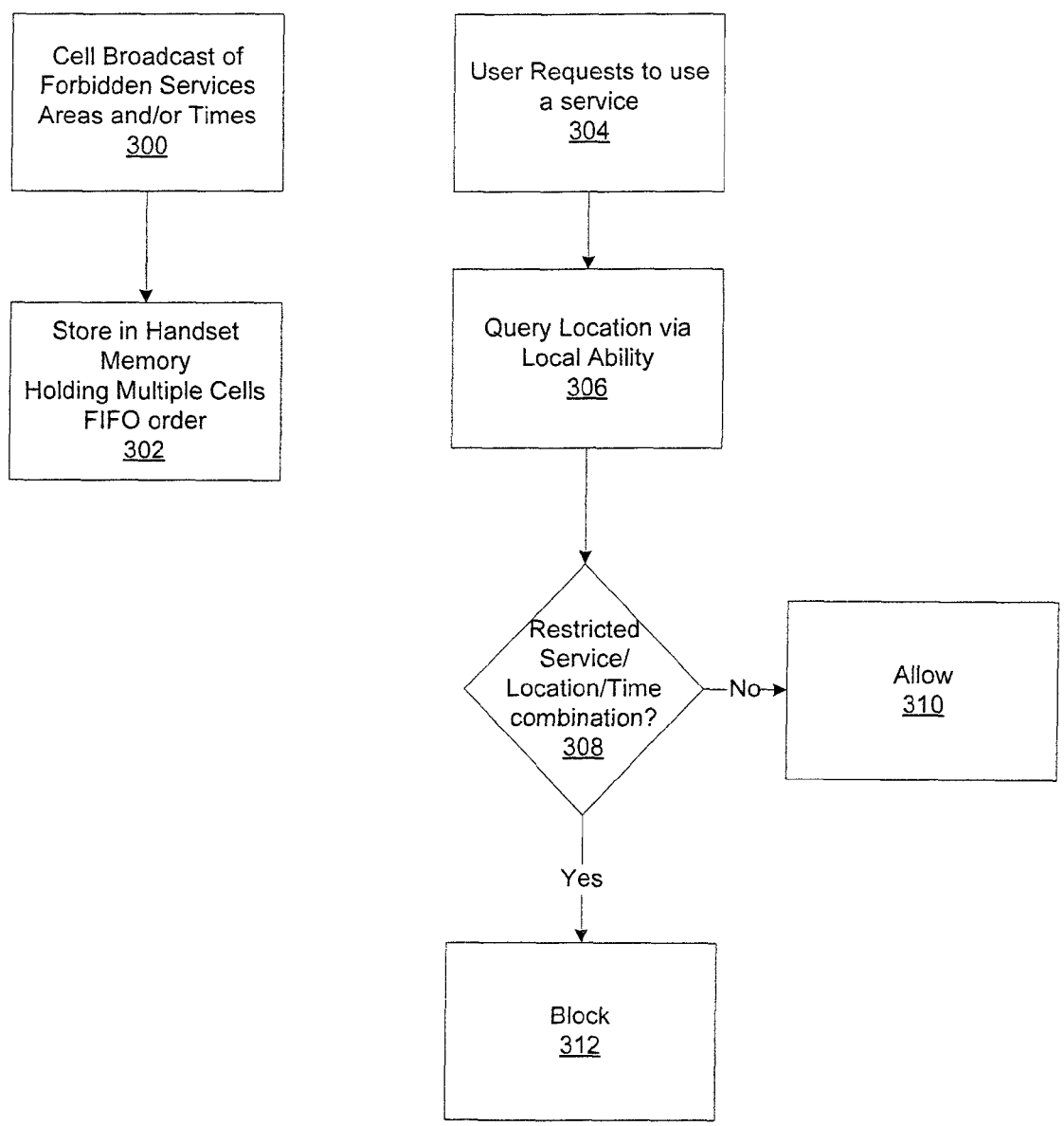
FIG. 5 illustrates an alternative embodiment using cell broadcast to communicate data to handsets regarding forbidden services within particular areas.

FIG. 5 illustrates an alternative where a cell broadcast may be implemented to communicate data to handsets regarding forbidden services within particular areas (step 300). The data also contain times when the services are forbidden within the particular areas. The data is stored in the MS/handset 102, preferably in a first-in-first-out (FIFO) order (step 302).

At a time after the receipt of the cell broadcast, a user may request to use a service (step 304). The MS/UE 102 determines its location via, e.g., GPS or some other local ability within the MS 102 (step 306). Next, the MS 102 determines if there is a restriction on the requested service, location and/or time (step 308). If not, then the service is allowed (step 310), otherwise the service is blocked (step 312).

While the present invention has been described in connection with the preferred embodiments of the various figures, it is to be understood that other similar embodiments may be used or modifications and additions may be made to the described embodiment for performing the same function of the present invention without deviating therefrom. For example, one skilled in the art will recognize that the present invention as described in the present application may apply to any environment, whether wired or wireless, and may be applied to any number of such devices connected via a communications network and interacting across the network. Therefore, the present invention should not be limited to any single embodiment, but rather should be construed in breadth and scope in accordance with the appended claims.

What is claimed is:

1. A method comprising:
   receiving, by a mobile handset, from a base transceiver station of a mobile communication network via a cell broadcast, data comprising a service provided via the mobile communication network and an area within which the service is unauthorized, wherein the base transceiver station transmits the data to a plurality of mobile handsets via the cell broadcast, and wherein the mobile handset is one of the plurality of mobile handsets;
   receiving, by the mobile handset, from a user of the mobile handset, a request for the service;
   determining, by the mobile handset, a location of the mobile handset;

determining, by the mobile handset, based on the data received via the cell broadcast, whether the service is unauthorized at the location of the mobile handset; and in response to the request for the service and to determining that the service is unauthorized at the location of the mobile handset, blocking, by the mobile handset, the service.

2. The method of claim 1, wherein the location of the mobile handset is determined based on a local ability within the mobile handset.

3. The method of claim 1, further comprising allowing the service, even though the service is unauthorized at the location of the mobile handset, in response to the service being associated with an emergency.

4. The method of claim 1, wherein the service is associated with at least one of a streaming of audio, a streaming of video, or peer-to-peer communications.

5. The method of claim 4, wherein blocking the service comprises blocking the streaming of audio from the mobile handset.

6. The method of claim 4, wherein blocking the service comprises blocking the streaming of video from the mobile handset.

7. The method of claim 1, wherein the data received by the mobile handset via the cell broadcast is stored at the mobile handset in a first-in-first-out order.

8. A method comprising:

receiving, by a mobile handset, from a base transceiver station of a mobile communication network via a cell broadcast, data comprising a service provided via the mobile communication network, an area, and a time during which the service is unauthorized in the area, wherein the base transceiver station transmits the data to a plurality of mobile handsets via the cell broadcast, and wherein the mobile handset is one of the plurality of mobile handsets;

receiving, by the mobile handset, from a user of the mobile handset at a current time, a request for the service;

determining, by the mobile handset, a location of the mobile handset;

determining, by the mobile handset, based on the data received via the cell broadcast, whether the service is unauthorized at the location of the mobile handset at the current time when the request for the service is received by the mobile handset from the user of the mobile handset; and in response to the request for the service and to determining that the service is unauthorized at the location of the mobile handset at the current time when the request for the service is received by the mobile handset from the user of the mobile handset, blocking, by the mobile handset, the service.

9. The method of claim 8, wherein the location of the mobile handset is determined based on a local ability within the mobile handset.

10. The method of claim 8, further comprising allowing the service, even though the service is unauthorized at the location of the mobile handset at the current time, in response to the service being associated with an emergency.

11. The method of claim 8, wherein the service is associated with at least one of a streaming of audio, a streaming of video, or peer-to-peer communications.

12. The method of claim 11, wherein blocking the service comprises blocking the streaming of audio from the mobile handset.

13. The method of claim 11, wherein blocking the service comprises blocking the streaming of video from the mobile handset.

14. The method of claim 8, wherein the data received by the mobile handset via the cell broadcast is stored at the mobile handset in a first-in-first-out order.

15. A mobile handset that performs operations comprising:

receiving, from a base transceiver station of a mobile communication network via a cell broadcast, data comprising a service provided via the mobile communication network and an area within which the service is unauthorized, wherein the base transceiver station transmits the data to a plurality of mobile handsets via the cell broadcast, and wherein the mobile handset is one of the plurality of mobile handsets;

receiving, from a user of the mobile handset, a request for the service;

determining a location of the mobile handset;

determining, based on the data received via the cell broadcast, that the location of the mobile handset is within the area within which the service is unauthorized; and in response to determining that the location of the mobile handset is within the area within which the service is unauthorized, blocking the service.

16. The mobile handset of claim 15, wherein the location of the mobile handset is determined based on a local ability within the mobile handset.

17. The mobile handset of claim 15, wherein the service is associated with at least one of a streaming of audio, a streaming of video, or peer-to-peer communications.

18. The mobile handset of claim 17, wherein blocking the service comprises blocking the streaming of audio from the mobile handset.

19. The mobile handset of claim 17, wherein blocking the service comprises blocking the streaming of video from the mobile handset.

20. The mobile handset of claim 15, wherein the operations further comprise allowing the service, even though the location of the mobile handset is within the area within which the service is unauthorized, in response to the service being associated with an emergency.

* * * * *